(12) United States Patent
Brand et al.

(10) Patent No.: US 7,944,391 B2
(45) Date of Patent: May 17, 2011

(54) CORRECTION FOR NEAR FIELD RADAR IMAGING

(75) Inventors: Kenneth L. Brand, West Hartford, CT (US); Alun L. Buttermore, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 358 days.

(21) Appl. No.: 12/023,130

(22) Filed: Jan. 31, 2008

(65) Prior Publication Data

US 2009/0195441 A1    Aug. 6, 2009

(51) Int. Cl.
*G01S 13/00* (2006.01)
*G01S 13/08* (2006.01)

(52) U.S. Cl. .................. 342/179; 342/118; 342/175

(58) Field of Classification Search .......... 342/118, 342/133, 165–186, 195
See application file for complete search history.

(56) References Cited

U.S. PATENT DOCUMENTS

| | | | | |
|---|---|---|---|---|
| 3,810,178 A * | 5/1974 | Basard et al. | ............... | 342/205 |
| 4,169,255 A * | 9/1979 | Hulsman et al. | ............... | 367/100 |
| 4,268,829 A * | 5/1981 | Baurle et al. | ............... | 342/380 |
| 4,315,325 A * | 2/1982 | Blades | ............... | 367/98 |
| 4,318,103 A * | 3/1982 | Roettele et al. | ............... | 342/20 |
| 4,435,707 A * | 3/1984 | Clark | ............... | 342/26 B |
| 4,516,853 A * | 5/1985 | Pearson | ............... | 356/139.08 |
| 4,527,161 A * | 7/1985 | Wehner | ............... | 342/152 |
| 4,686,532 A * | 8/1987 | McAulay | ............... | 342/195 |
| 4,805,627 A * | 2/1989 | Klingenbeck et al. | ............... | 600/425 |
| 5,128,681 A * | 7/1992 | McGroary et al. | ............... | 342/132 |
| 5,166,689 A * | 11/1992 | Pankow et al. | ............... | 342/77 |
| 5,191,343 A * | 3/1993 | Danzer et al. | ............... | 342/21 |
| 5,530,651 A * | 6/1996 | Uemura et al. | ............... | 701/301 |
| 5,554,991 A * | 9/1996 | Maitre et al. | ............... | 342/184 |
| 5,831,719 A * | 11/1998 | Berg et al. | ............... | 356/5.13 |
| 5,835,054 A * | 11/1998 | Warhus et al. | ............... | 342/22 |
| 5,905,457 A * | 5/1999 | Rashid | ............... | 342/70 |
| 5,966,678 A * | 10/1999 | Lam | ............... | 702/97 |
| 6,040,795 A * | 3/2000 | Watanabe | ............... | 342/70 |
| 6,188,348 B1 * | 2/2001 | Raney | ............... | 342/22 |
| 6,529,157 B1 * | 3/2003 | Mensa et al. | ............... | 342/173 |
| 6,593,874 B2 * | 7/2003 | Yamashita | ............... | 342/118 |
| 6,741,205 B2 * | 5/2004 | Nagasaku | ............... | 342/174 |
| 6,897,819 B2 * | 5/2005 | Henderson et al. | ............... | 343/713 |
| 7,193,558 B1 * | 3/2007 | Gerlach et al. | ............... | 342/195 |
| 7,205,932 B2 * | 4/2007 | Fiore | ............... | 342/133 |
| 7,259,715 B1 * | 8/2007 | Garren et al. | ............... | 342/179 |
| 7,295,148 B2 * | 11/2007 | Fukute | ............... | 342/70 |
| 7,345,620 B2 * | 3/2008 | Voigtlaender et al. | ............... | 342/82 |
| 7,515,098 B1 * | 4/2009 | Garren et al. | ............... | 342/179 |
| 7,561,099 B2 * | 7/2009 | Wakayama et al. | ............... | 342/85 |

* cited by examiner

*Primary Examiner* — Thomas H Tarcza
*Assistant Examiner* — Peter Bythrow
(74) *Attorney, Agent, or Firm* — Carlson, Gaskey & Olds

(57) ABSTRACT

A near field radar imaging system looks at the distance between the several points under evaluation, and corrects image strength based upon varying distances such that a more accurate image of the object under evaluation is provided.

20 Claims, 1 Drawing Sheet

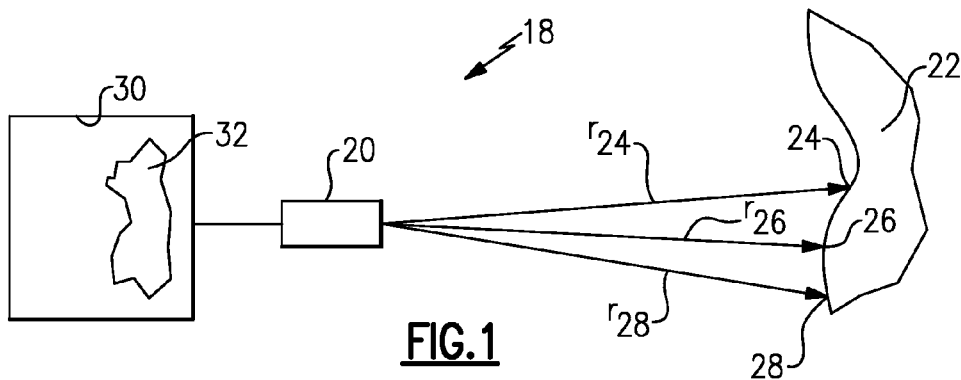
FIG.1
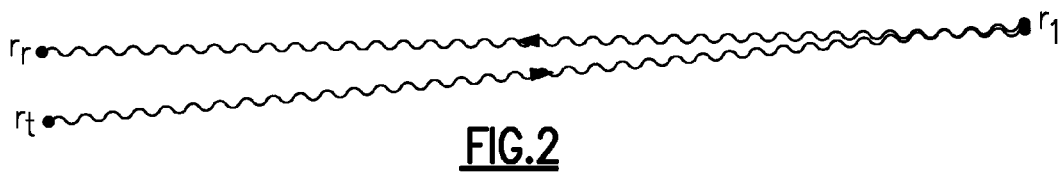
FIG.2
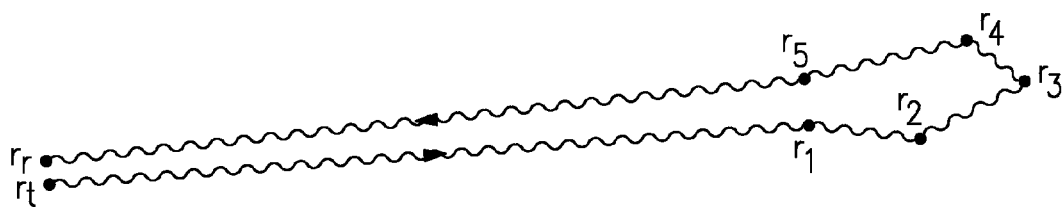
FIG.3
| $R_o$ (feet) | $R^4$ term from pt.$\alpha$ | $R^4$ term from pt.$\beta$ | Multiple Scattering Over-Correction |
|---|---|---|---|
| 10.0 | −6.196 dB | 7.044 dB | 13.240 dB |
| 20.0 | −2.823 | 3.876 | 6.700 |
| 50.0 | −1.075 | 1.656 | 2.731 |
| 100.0 | −0.529 | 0.848 | 1.377 |
| 200.0 | −2.263 | 0.429 | 0.692 |
| 200.0 | −0.105 | 0.173 | 0.277 |
| 1000.0 | −0.052 | 0.087 | 0.139 |
| 2000.0 | −0.026 | 0.043 | 0.069 |
| 5000.0 | −0.010 | 0.017 | 0.028 |
FIG.4

CORRECTION FOR NEAR FIELD RADAR IMAGING

BACKGROUND OF THE INVENTION

This application relates to radar imaging of an object.

Radar has been widely utilized in a number of applications for decades. In its traditional uses, radar has been utilized to identify a component a good distance away from the radar system. Well known examples include monitoring approaching aircraft, as an example.

More recently, near field radar imaging has been utilized, particularly in quality control applications. Near field radar imaging directs radar beams at an object, and processes the reflected signals to create an image of the component. This imaging can be utilized as quality control to check the relative surfaces of various locations on an object, or check other aspects of quality. As one example, aircraft, in particular for military applications, are often provided with a coating intended to mask radar reflectivity. Near field radar quality control imaging is often performed on such components to determine the quality of the coating, by looking at the reflectivity of various points on the coated component.

The distance between a component and the radar system impacts the signal strength. Thus, the signal strength will differ between adjacent locations on an object should the distance between the radar system and those particular points be different.

In the traditional application of monitoring a distant item, such as an approaching aircraft, these differences in distances for points on a component are so insignificant compared to the overall distance that no correction is necessary. However, in near field imaging, the different distances between closely related surfaces on a component can adversely effect the quality control information being provided by the near field radar imaging.

In the traditional application of near field imaging, a correction to the image strength is made at each point in the image based on the apparent distance between the image location and the radar antenna. This correction is referred to as the "R to the fourth" ($R^4$) correction, as the correction depends on the fourth power of the distance between the image location and the radar antenna

SUMMARY OF THE INVENTION

In a disclosed embodiment of this invention, an image of an object is created by a radar imaging system by analyzing a reflected signal from a plurality of locations on the object, and utilizing an improved correction factor to correct for different distances between the radar system and the various points on the object to adjust the image strength.

These and other features of the present invention can be best understood from the following specification and drawings, the following of which is a brief description.

BRIEF DESCRIPTION OF THE DRAWINGS

FIG. 1 is a schematic view of a near field radar imaging system for imaging a component.

FIG. 2 shows a first case of a reflected beam.

FIG. 3 shows a second case.

FIG. 4 is a table showing example calculations utilized with different distances between a radar system and points on a component.

DETAILED DESCRIPTION OF THE PREFERRED EMBODIMENT

A near field radar imaging system 18 is illustrated in FIG. 1. A radar system 20 directs beams at an object 24. Object 24 is shown receiving reflected beams at points 24, 26, and 28. As known, these beams are reflected and bounce back to the radar system 20. A sensor on the radar system 20 receives those reflected beams, and determines a signal strength. The reflected beams are utilized with a control, shown as computer 30, to create an image 32 of the component. The computer 30 can be any type of processor which is operable to receive and process information received from the radar system 20.

As can be appreciated, the distance $r_{24}$, $r_{26}$, and $r_{28}$ to each of the points 24, 26, and 28 is different. As will be explained below, due to these different distances, the reflected signal strength will also vary. The present invention is directed to compensating for the effect of these different distances on the signal strength.

An expression for the received field from scattering from a single point scatterer is relatively straightforward. Suppose the transmitting antenna is located at $r_t$, the fields are scattered from the object under test at $r_1$, and directed back to the receive antenna, which is located at $r_r$. See FIG. 2.

The transmit location and receive location are shown as distinct for clarity, but are often co-located. The received signal is given by, $$V = C\hat{P}_t g(r_1 - r_t, k) \sum_{\alpha,\beta} \cdot \hat{P}_\alpha^\dagger s(\widehat{r_r - r_1}, \widehat{r_r - r_1}, \alpha, \beta, k) \hat{P}_\beta g(r_r - r_1, k) \cdot \hat{P}_r^\dagger \quad (1.1)$$

where $\hat{P}$ is the polarization vector of the transmitting antenna, g(r, k) represents the propagator function, k is the wave number for the frequency of interest, α and β represent polarization states, $\hat{P}_t$ is the complex conjugate of the polarization vector of the receiving antenna, and s(Î, Ô, α, β, k) represents the differential scattering matrix of the scatterer, for incoming direction Î, outgoing direction and incoming and outgoing polarization states, α and β. The constant C is intended to capture other non-pertinent terms, such as the strength of the incident field, numeric constants, etc.

Next, it is assumed that the scattering matrix, s(Î, Ô, α, β, k) is a slowly varying function of frequency, and that in an expression such as equation 1.1 above, the scattering matrix function can be replaced as some average function over the frequency band of interest. With this proviso, equation 1.1 becomes:

$$V = C\hat{P}_t g(r_1 - r_t, k) \sum_{\alpha,\beta} \cdot \hat{P}_\alpha^\dagger s_{av}(\widehat{r_r - r_1}, \widehat{r_r - r_1}, \alpha, \beta) \hat{P}_\beta g(r_r - r_1, k) \cdot \hat{P}_r^\dagger \quad (1.2)$$

The propagator function, g(r, k), varies approximately as $$\frac{e^{ik|r|}}{|r|}.$$

Using this expression for the propagator in equation 1.2 shows that the received signal can be expressed as:

$$V = \frac{R_o}{|r_1 - r_t|} \frac{R_o}{|r_r - r_1|} e^{ik[|r_1 - r_t| + |r_r - r_1|]} S \quad (1.3)$$

where $$S = C\hat{P}_t \sum_{\alpha,\beta} \cdot \hat{P}_\alpha^\dagger s_{av}(\overrightarrow{r_1 - r_t}, \overrightarrow{r_r - r_1}, \alpha, \beta) \hat{P}_\beta \cdot \hat{P}_r^\dagger \quad (1.4)$$

and where $R_o$ is the distance between the average location of the transmit/receive antennas and the average location on the scattering body. Note that the scattering strength, S does not depend on the frequency of interest. It does depend on the frequency band chosen. It is this scattering strength that is desired as a function of position. The values of S are used to form a Synthetic Aperture Radar or Inverse Synthetic Aperture Radar image.

Performing a Fourier transform (with respect to frequency) of equation 1.3 gives $$\tilde{V}\left(\frac{|r_1 - r_t| + |r_r - r_1|}{2}\right) = \frac{R_o}{|r_1 - r_t|} \frac{R_o}{|r_r - r_1|} S \quad (1.5)$$

The factor of ½ in the argument of the Fourier transform is by convention, so that the length argument corresponds to "how far away is the target," and not "how far has the ray traveled." Notice that the Fourier transform does not directly give the scattering amplitude. The scattering amplitude is found by a straightforward manipulation of equation 1.5.

$$S = \left[\frac{|r_1 - r_t|}{R_o} \frac{|r_r - r_1|}{R_o}\right] \tilde{V}\left(\frac{|r_1 - r_t| + |r_r - r_1|}{2}\right) \quad (1.6)$$

The term within the brackets ([ ]) in Equation 1.6 is referred to as the $R^4$ correction, since it adjusts the scattering power per unit length (for one dimensional imaging, or per unit area for two dimension imaging, or per unit volume for three dimensional imaging) by a term proportional to the fourth power of the distance. Notice that for this single point scattering example, for monostatic scattering, that the numerator of the $R^4$ correction terms are the same, and are also equal to the perceived downrange distance (i.e., the argument of the Fourier transform of V).

For image features caused by multiple interactions, the beam interacts with the object under test more than once. A typical arrangement is shown in FIG. 3. The transmitting antenna is located at $r_t$. The fields are scattered from the object under test at $r_1$, then scattered, in turn, to locations $r_2$, $r_3$, $r_4$, and $r_5$, all of which are on the object under test. Finally, the ray leaves $r_5$ and is directed back to the receive antenna, which is located at the point $r_r$.

Using notation similar to that used in the previous section, the received voltage can be expressed as:

$$V = C\hat{P}_t g(r_1 - r_t, k) \times \times \quad (2.1)$$

$$\sum_{\alpha_1,\beta_1} \cdot \hat{P}_{\alpha_1}^\dagger s_1(\overrightarrow{r_1 - r_t}, \overrightarrow{r_2 - r_1}, \alpha_1, \beta_1, k) \hat{P}_{\beta_1} g(r_2 - r_1, k) \times \times$$

-continued $$\sum_{\alpha_2,\beta_2} \cdot \hat{P}_{\alpha_2}^\dagger s_2(\overrightarrow{r_2 - r_1}, \overrightarrow{r_3 - r_2}, \alpha_2, \beta_2, k) \hat{P}_{\beta_2} g(r_3 - r_2, k) \times \times$$

$$\sum_{\alpha_3,\beta_3} \cdot \hat{P}_{\alpha_3}^\dagger s_3(\overrightarrow{r_3 - r_2}, \overrightarrow{r_4 - r_3}, \alpha_3, \beta_3, k) \hat{P}_{\beta_3} g(r_4 - r_3,$$

$$k) \times \times \sum_{\alpha_4,\beta_4} \cdot \hat{P}_{\alpha_4}^\dagger s_4(\overrightarrow{r_4 - r_3}, \overrightarrow{r_5 - r_4}, \alpha_4, \beta_4, k)$$

$$\hat{P}_{\beta_4} g(r_5 - r_4, k) \times \times \sum_{\alpha_5,\beta_5} \cdot \hat{P}_{\alpha_5}^\dagger s_5(\overrightarrow{r_5 - r_4},$$

$$\overrightarrow{r_r - r_5}, \alpha_5, \beta_5, k) \hat{P}_{\beta_5} g(r_r - r_5, k) \times \times \cdot \hat{P}_r^\dagger$$

where the various terms are defined analogously to those in the previous section. As before, it is convenient to define frequency band averaged scattering matrices. Using these average terms in equation 2.1 gives $$V = C\hat{P}_t g(r_1 - r_t, k) \times \times \quad (2.2)$$

$$\sum_{\alpha_1,\beta_1} \cdot \hat{P}_{\alpha_1}^\dagger s_{av1}(\overrightarrow{r_1 - r_t}, \overrightarrow{r_2 - r_1}, \alpha_1, \beta_1, k) \hat{P}_{\beta_1} g(r_2 - r_1, k) \times \times$$

$$\sum_{\alpha_2,\beta_2} \cdot \hat{P}_{\alpha_2}^\dagger s_{av2}(\overrightarrow{r_2 - r_1}, \overrightarrow{r_3 - r_2}, \alpha_2, \beta_2, k) \hat{P}_{\beta_2} g(r_3 - r_2, k) \times \times$$

$$\sum_{\alpha_3,\beta_3} \cdot \hat{P}_{\alpha_3}^\dagger s_{av3}(\overrightarrow{r_3 - r_2}, \overrightarrow{r_4 - r_3}, \alpha_3, \beta_3, k) \hat{P}_{\beta_3} g(r_4 - r_3,$$

$$k) \times \times \sum_{\alpha_4,\beta_4} \cdot \hat{P}_{\alpha_4}^\dagger s_{av4}(\overrightarrow{r_4 - r_3}, \overrightarrow{r_5 - r_4}, \alpha_4, \beta_4, k)$$

$$\hat{P}_{\beta_4} g(r_5 - r_4, k) \times \times \sum_{\alpha_5,\beta_5} \cdot \hat{P}_{\alpha_5}^\dagger s_{av5}(\overrightarrow{r_5 - r_4},$$

$$\overrightarrow{r_r - r_5}, \alpha_5, \beta_5, k) \hat{P}_{\beta_5} g(r_r - r_5, k) \times \times \cdot \hat{P}_r^\dagger$$

Using the form given previously for the propagator function, and extracting the terms with frequency (k) dependence gives $$V = \frac{R_o}{|r_1 - r_t|} \frac{R_o}{|r_r - r_5|} e^{ik[|r_1 - r_t| + |r_2 - r_1| + |r_3 - r_2| + |r_4 - r_3| + |r_5 - r_4| + |r_r - r_5|]} S \quad (2.3)$$

where $$S = C\hat{P}_t \sum_{\alpha_1,\beta_1} \cdot \hat{P}_{\alpha_1}^\dagger s_{av1}(\overrightarrow{r_1 - r_t}, \overrightarrow{r_2 - r_1}, \alpha_1, \beta_1, k) \hat{P}_{\beta_1} \quad (2.4)$$

$$\frac{1}{|r_2 - r_1|} \times \times \sum_{\alpha_2,\beta_2} \cdot \hat{P}_{\alpha_2}^\dagger s_{av2}(\overrightarrow{r_2 - r_1}, \overrightarrow{r_3 - r_2}, \alpha_2, \beta_2, k) \hat{P}_{\beta_2}$$

$$\frac{1}{|r_3 - r_2|} \times \times \sum_{\alpha_3, \beta_3} \cdot \hat{P}^\dagger_{\alpha_3} s_{av3}(\overrightarrow{r_3 - r_2}, \overrightarrow{r_4 - r_3}, \alpha_3, \beta_3, k)$$

$$\hat{P}_{\beta_3} \frac{1}{|r_4 - r_3|} \times \times \sum_{\alpha_4, \beta_4} \cdot \hat{P}^\dagger_{\alpha_4}$$

$$s_{av4}(\overrightarrow{r_4 - r_3}, \overrightarrow{r_5 - r_4}, \alpha_4, \beta_4, k) \hat{P}_{\beta_4} \frac{1}{|r_5 - r_4|} \times \times$$

$$\sum_{\alpha_5, \beta_5} \cdot \hat{P}^\dagger_{\alpha_5} s_{av5}(\overrightarrow{r_5 - r_4}, \overrightarrow{r_r - r_5}, \alpha_5, \beta_5, k) \hat{P}_{\beta_5} \cdot \hat{P}^\dagger_r$$

The term S is characteristic of the scattering mechanism on the object and does not depend on the distance from the object to the antennas. Performing a Fourier transform (with respect to frequency) of equation 2.3, and following the convention of dividing the distance argument by two, gives $$\tilde{v}\left(\frac{|r_1 - r_t| + |r_2 - r_1| + |r_3 - r_2| +}{|r_4 - r_3| + |r_5 - r_4| + |r_r - r_5|}\right) = \frac{R_o}{|r_1 - r_t|} \frac{R_o}{|r_r - r_5|} S \quad (2.5)$$

As before, the Fourier transform of the received signal does not directly give the scattering strength. However, simple algebra does give the scattering strength as:

$$S = \left[\frac{|r_1 - r_t|}{R_o} \frac{|r_r - r_5|}{R_o}\right] \tilde{v}\left(\frac{|r_1 - r_t| + |r_2 - r_1| + |r_3 - r_2| +}{|r_4 - r_3| + |r_5 - r_4| + |r_r - r_5|}\right) \quad (2.6)$$

The term within the brackets of equation 2.6 is the $R^4$ correction term. The distance in the numerator is not the perceived downrange distance, $$\frac{|r_1 - r_t| + |r_2 - r_1| + |r_3 - r_2| + |r_4 - r_3| + |r_5 - r_4| + |r_r - r_5|}{2},$$

as it was for the simple scattering case. The correct distances to use are the distance from the transmit antenna to point $r_1$, (referred to as the "attachment point") and the distance from the point $r_5$ (referred to at the "Launching point") to the receive antenna. Of course, there will be situations where the multiple scattering has more or less than five points of impact. The equation can be adjusted accordingly, and a worker of ordinary skill in this art would recognize how to modify the equation.

The equation for any number of points is as follows:

$$S = \left[\frac{|r_1 - r_t|}{R_o} \frac{|r_r - r_N|}{R_o}\right] \tilde{v}\left(\frac{|r_1 - r_t| + |r_r - r_N| + \sum_{l=1}^{N-1} |r_l - r_{l+1}|}{2}\right) \quad (2.7)$$

The term within the brackets of equation 2.7 is the art of the fourth correction term. The value of N, the number of points on the object that the ray interacts with, can be as low as one and can be arbitrarily large.

This can be generalized as follows. For monostatic scattering, the proper distance to be used for the $R^4$ correction term is the geometric mean of the distance from the antenna to the "attachment point," and to the "launching point." This association with attachment points and launching points is reminiscent with the situation in two dimensional imaging. In two dimensional imaging, the perceived cross-range location of a multiple scattering phenomenon is the average cross-range location of the attachment and launching points.

The discussion above applies to a one-dimensional image. However, the same $R^4$ correction term is appropriate for two-dimensional or higher-dimensional images and could be implemented a worker of ordinary skill in this art.

The discussion can be illustrated by considering some examples. For the first case, consider simple, monostatic scattering from a feature located three feet closer to the antenna than the reference point (typically the center point). Let us refer to this scattering point as point α. Suppose that the distance, $R_o$, from the antenna to the reference point, $R_o$ is 50 feet. Then the correction term is given by equation 1.6. The value is:

$$20 \log_{10}\left[\left(\frac{47}{50}\right)\left(\frac{47}{50}\right)\right] = -1.075 \text{ dB}.$$

The leading term of 20 comes from converting equation 1.6, which is related to signal strength, to a term which deals with power (the square of the signal).

For a second case, consider simple, monostatic scattering from a feature located five feet farther from the antenna than the reference point. Let us refer to this scattering point as point β. Again, suppose that the distance from the antenna to the reference point is fifty feet. Then the correction term is:

$$20 \log_{10}\left[\left(\frac{55}{50}\right)\left(\frac{55}{50}\right)\right] = +1.656 \text{ dB}.$$

For the third and final case, consider multiple scattering on this object. Suppose that for a particular monostatic scattering phenomenon, the energy first scatters from point α, then proceeds to interact with various other points on the object, eventually returning to point α, and from there heads back to the antenna. Let us further suppose that the path length traversed by the ray from when it leaves point α to when it returns to that point is 16 feet. On an image, this mechanism will appear at a location eight feet (16/2) farther away from the antenna than point α. The proper correction term is a function of the first and last point that the ray "tags" on the target. See equation 2.6. Therefore, the proper correction term is the same as the correction found in the first case, −1.075 dB.

FIG. 4 repeats these three cases for various distances, $R_o$ from the target reference point to the antenna. This table shows that for large radar ranges, the $R^4$ correction term is not particularly significant, but that for near field ranges, it is helpful to use the correct $R^4$ term. In order to calculate the correct term, the scattering mechanism is identified (so that one can differentiate, for example cases two and three above).

As can be appreciated, the correction factor is then utilized to adjust the received signal, such that the image 32 created and displayed is accurate for components located at different distances. Now, the image 32 created by the radar system 20 will be more effective in providing quality control information, and provide more accurate information with regard to the component 22 under evaluation. It should be noted that a computing device can be used to implement various functionality, such as that attributable to the computer 30 depicted in FIG. 1. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A radar imaging system comprising:
a radar transmitter and receiver, and a control for said radar transmitter and receiver, said control being operable to receive a plurality of reflected signals, and correct an image strength of said plurality of reflective signals based upon different distances between a point on a component under evaluation from which the reflected signal is received, such that the created image is more accurate and corrected for the different distances.

2. The radar imaging system as set forth in claim 1, wherein a correction factor is added or subtracted to an image strength to correct the signal strength.

3. The radar imaging system as set forth in claim 2, wherein the correction factor takes into account a multiple scattering interaction.

4. The radar imaging system as set forth in claim 3, wherein the correction factor for a location on an image is calculated by taking the distance between the corresponding attachment point for the image location under consideration and the radar transmitter, as well as by taking the distance between the corresponding launching point for the image location under consideration and radar receiver.

5. The radar imaging system as set forth in claim 4, wherein the image is one dimensional.

6. The radar imaging system as set forth in claim 4, wherein the image has at least two dimensions.

7. The radar imaging system as set forth in claim 4, wherein the transmitted signal is reflected off multiple points.

8. The radar imaging system as set forth in claim 7, wherein the image is one dimensional.

9. The radar imaging system as set forth in claim 7, wherein the image is two dimensional.

10. The radar imaging system as set forth in claim 7, wherein the image is three dimensional.

11. The radar imaging system as set forth in claim 7, wherein the image has one, two or three spatial dimensions and one or more non-spatial dimensional. Examples of non spatial dimensions include, but are not limited to time, for time-varying objects, or any other parameter that could change on the object.

12. The radar imaging system as set forth in claim 2, wherein the correction factor is provided by:

$$\left[ \frac{|r_1 - r_t|}{R_o} \frac{|r_r - r_N|}{R_o} \right]$$

wherein N is the number of points on the object with which a signal will interact, and $R_o$ is the distance between the average location of an antenna on the radar imaging system and the average location on the scattering body.

13. A method of operating a radar system including the steps of:
(a) receiving a plurality of reflected signals; and
(b) correcting image strengths of said plurality of reflective signals based upon different distances between the corresponding attachment points and transmit antenna(s), as well as the distance between the corresponding launching points and receive antenna(s), wherein these distances are calculated for various locations on the image such that the created image is more accurate and corrected for the different distances.

14. The method as set forth in claim 12, wherein a correction factor is added or subtracted to a signal strength to correct the signal strength.

15. The method as set forth in claim 13, wherein the correction factor takes into account a multiple scattering interactions.

16. The method as set forth in claim 13, wherein the correction factor for a location on an image is calculated by taking the distance between the corresponding attachment point for the image location under consideration and the radar transmitter, as well as by taking the distance between the corresponding launching point for the image location under consideration and radar receiver.

17. The method as set forth in claim 13, wherein the correction factor is provided by $$\left[\frac{|r_1 - r_t|}{R_o} \frac{|r_r - r_N|}{R_o}\right]$$

wherein N is the number of points on the object with which a signal will interact, and $R_o$ is the distance between the average location of an antenna on the radar imaging system and the average location on the scattering body.

18. The method as set forth in claim 12, wherein the creative image is one dimensional.

19. The method as set forth in claim 12, wherein the creative image is two dimensional.

20. The method as set forth in claim 12, wherein the creative image is three dimensional.

\* \* \* \* \*